United States Patent [19]

Grünbacher et al.

[11] 4,057,814

[45] Nov. 8, 1977

[54] SUB-MINIATURE CAMERA CONSTRUCTION

[75] Inventors: Martin Grünbacher; Hans Werner Johannsen, both of Braunfels, Germany

[73] Assignee: Firma Minox GmbH, Giessen, Germany

[21] Appl. No.: 648,362

[22] Filed: Jan. 12, 1976

[30] Foreign Application Priority Data

Jan. 22, 1975 Germany .............................. 2502364

[51] Int. Cl.² ...................... G03B 17/42; G03B 19/02; G03B 17/36
[52] U.S. Cl. .................................. 354/204; 354/207; 354/217
[58] Field of Search ......... 354/204, 207, 217

[56] References Cited
U.S. PATENT DOCUMENTS

| | | | |
|---|---|---|---|
| 3,412,665 | 11/1968 | Greger et al. ........................ | 354/207 |
| 3,489,070 | 1/1970 | Fauth ................................... | 354/207 |
| 3,646,862 | 3/1972 | Von Sybel et al. ................... | 354/207 |

*Primary Examiner*—John Gonzales
*Attorney, Agent, or Firm*—Edmund M. Jaskiewicz

[57] ABSTRACT

A sub-miniature camera has a rotatable winding knob which moves the film and cocks the shutter of the objective. A slide is movable by the knob between initial and end positions and blocks a release button from actuation when the slide is in its initial position and releases the button when the slide is in its end position. The slide is provided with a slot through which passes a rod of the release button and the slot and rod co-act to block and unblock the release button. The shutter is operated electrically by contact means closed by the slide moving to its initial position. The slide also actuates an exposure counter and the exposure counter is returnable to the zero counting position upon opening of the camera housing.

15 Claims, 10 Drawing Figures

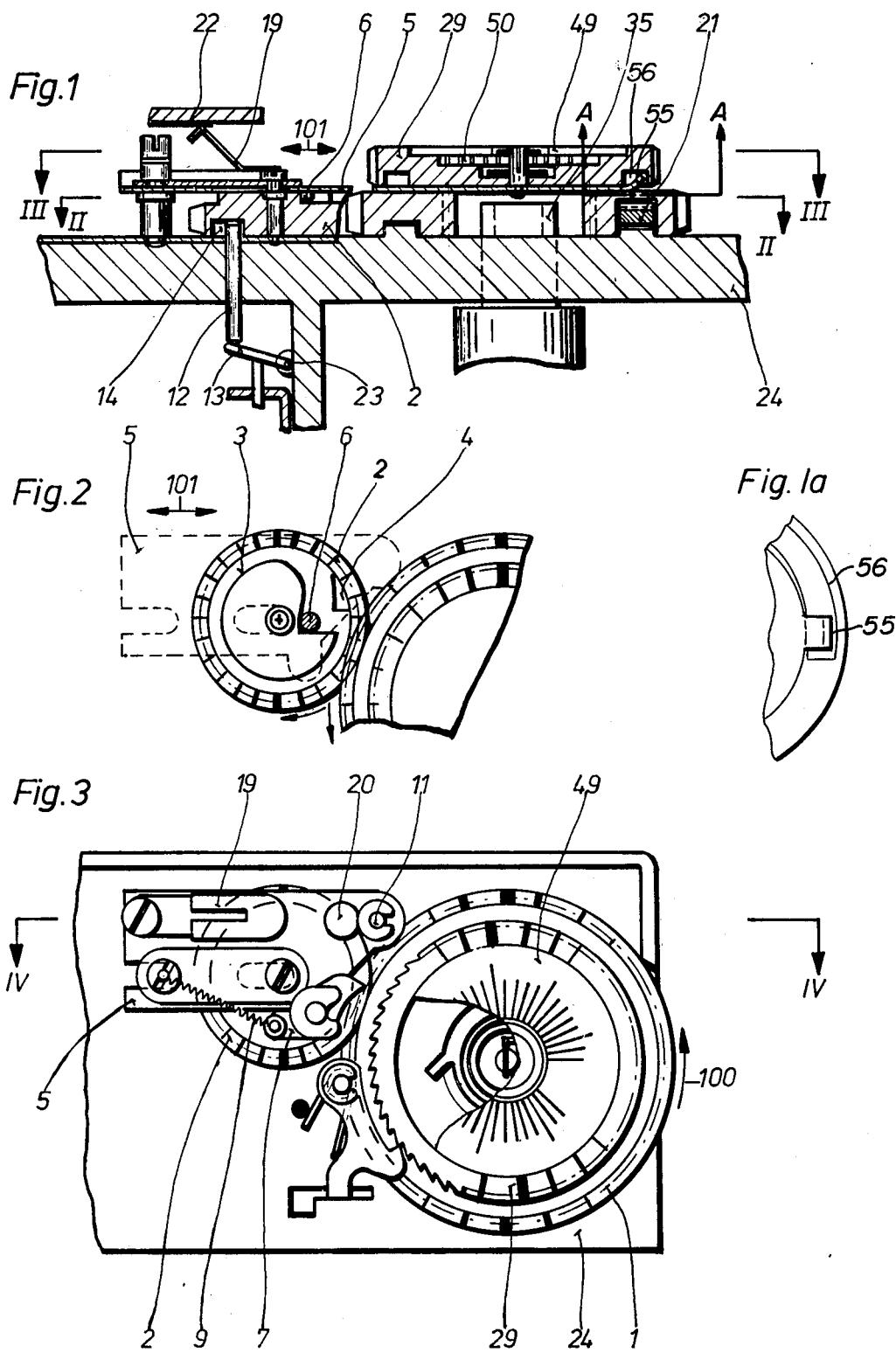

SUB-MINIATURE CAMERA CONSTRUCTION

The present invention relates to a sub-miniature camera of the type having a winding knob for moving the film and cocking the shutter and a release button for operation of the shutter, more particularly, to the arrangement of the operating components of such a camera.

One form of a sub-miniature camera has a winding knob the rotation of which both moves the film in the camera and cocks the shutter of the objective. A release button is also provided for operation of the shutter to make an exposure. While the size of such cameras limits the features which may be incorporated therein it is nevertheless extremely desirable that such cameras are provided with a locking mechanism for preventing double exposure, an exposure counter and other features which are necessary for effective utilization of such a camera. Not only must such features be provided but the elements comprising such features must be located in the smallest possible space while still being capable of reliable and fool-proof operation.

It is the principal object of the present invention to provide such a sub-miniature camera which has full operational capacity but incorporating the smallest number of parts which are capable of multiple functions.

It is a further object of the present invention to provide such a miniature camera wherein the operating components occupy a minimum of space but provide foolproof and reliable operation.

The objects of the present invention are achieved in such a camera by providing that operating the winding knob will displace a slide against the action of a spring from its initial into an end position. When the slide reaches its end position a release button will be unblocked and upon actuation of the release button the slide will be released. The slide carries an electric contact which closes a circuit leading to the shutter of the objective when the slide is released and reaches its initial position.

According to the present invention the slide and the release button are reciprocably locked and the release button is blocked in the uncocked position of the shutter. When the camera is ready to shoot an exposure, the slide is displaced into its end position and unblocks the release button. The release button in its actuated position then blocks return movement of the slide. Only after the release button is actuated can the slide be released and operates the shutter through the electrical contact arrangement.

According to one aspect of the present invention such a camera may comprise a rotatable winding knob which moves the film in the camera and cocks a shutter of the objective. A slide is operatively connected to the winding knob so as to be displaceable between initial and end positions. A spring urges the slide into its initial position. A release button is blocked from actuation by the slide when the slide is in its initial position and is released from actuation when the slide is in its end position. Means co-act between the release button and the slide for releasing the slide for displacement to its initial position under action of the spring upon actuation of the release button. Electric contact means are closed by the slide returning to its initial position for actuating a circuit to operate the shutter of the objective.

Other objects and advantages of the present invention will be apparent upon reference to the accompanying description when taken in conjunction with the following drawings, which are exemplary, wherein;

FIG. 1 is a sectional view through a portion of a camera incorporating the present invention illustrating the winding knob, the cam disc, and the slide;

FIG. 1a is a bottom plan view of a portion of the camera of FIG. 1 looking in the direction of the line A—A;

FIG. 2 is a sectional view taken along the line II—II of FIG. 1 and showing a portion thereof;

FIG. 3 is a sectional view taken along the line III—III of FIG. 1;

Proceeding next to the drawings wherein like reference symbols indicate the same parts throughout the various views, a specific embodiment of the present invention will be described in detail.

Figure 4:
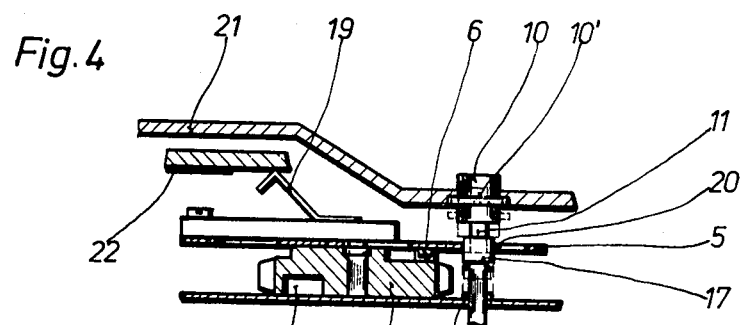
FIG. 4 is a sectional view taken along the line IV—IV of FIG. 3.

As may be seen in FIG. 1, the upper portion of the camera indicated at 24 is provided with a winding knob 1 which can be rotated in the direction of the arrow 100 and is provided with a gear which meshes with a further gear 2 upon which is mounted a cam disc 3. The ratio between gears 1 and 2 is 1:2 so that a half revolution of knob 1 will cause the gear 2 together with the cam disc 3 to rotate a full revolution.

Figure 5:
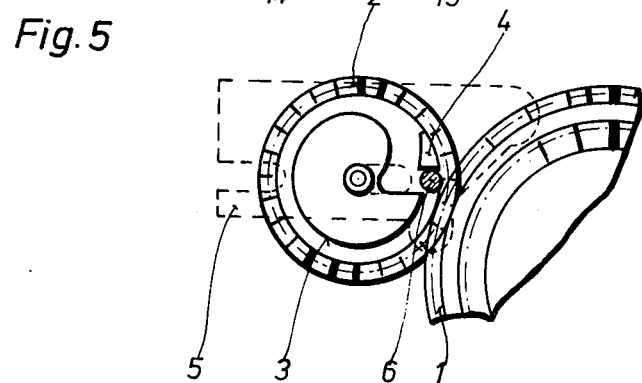
FIG. 5 is a view similar to that of FIG. 2 but showing the slide in a different position.

A slide 5 is mounted above the gear 2 so as to be displaceable in the direction of the double ended arrow 101 in a guide structure which is not illustrated. A tension spring 9 is connected to the slide 5 to urge the slide 5 to the left as viewed in FIGS. 3 and 6. On the lower surface of slide 5 there is a pin 6 which is always in contact with cam disc 3 because of the action exerted by the spring 9. When the knob 1 is turned, the cam disc 3 will urge the pin 6 and together therewith slide 5 to the right as shown in FIG. 2. A stop 4 is attached to the gear 2 so that after a complete revolution of cam disc 3 the stop 4 will abut against pin 6 and prevent any further turning of the cam disc 3. The slide 5 is now in its right end position which is shown in FIG. 5.

Figure 6:
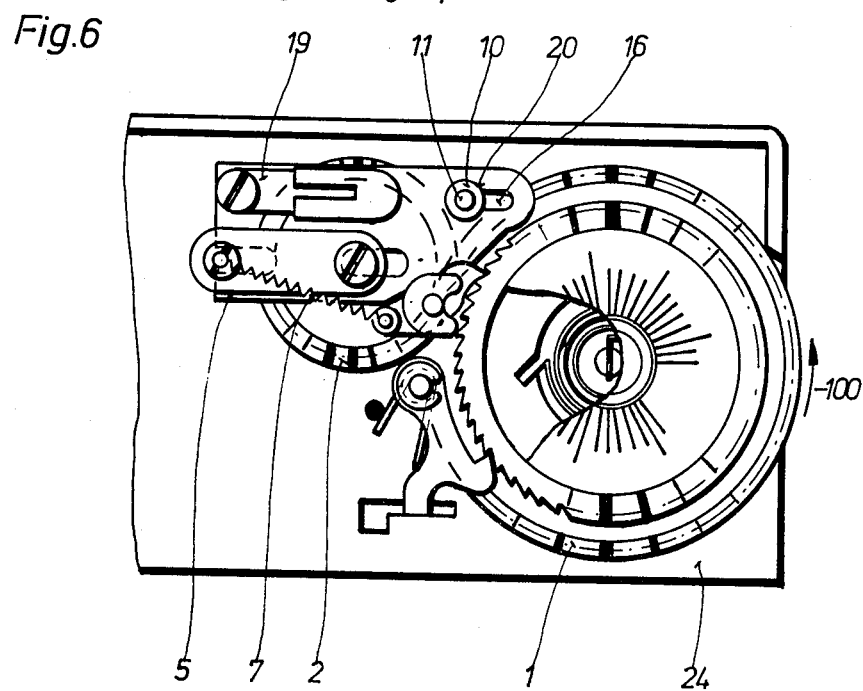
FIG. 6 is a view similar to that of FIG. 3 and showing the slide in a different position.

As can be seen in FIG. 6, the slide 5 is provided with a longitudinally extending slot 16 having a widened portion 20 therein. This widened portion 20 will accommodate a larger diameter portion 17 on a release button 10 (FIG. 4) which is also provided with a rod 11 which can be accommodated in the slot 16. A spring 15 urges the release button 10 outwardly through an upper wall 21 of the camera housing so that the button projects slightly above the housing surface. In this position, the release button 10 will hold the slide 5 in its right end position by means of the larger diameter portion 17 of the release button being received in the wider portion 20 of the slide.

In order to expose the film, the release button 10 is pressed downwardly into a position 10' as shown by the dashed lines. This downward movement of the release button will cause the larger diameter portion 17 to move downwardly below the slide 5 as shown in FIG. 4 and the slide will thus be pulled toward the left by the spring 9. This movement of the slide is possible since the rod 11 is accommodated in the slot 16 and permits this sliding displacement movement of the slide.

The larger diameter portion 17 of the release button is now positioned below the slide slot 16 and the release button cannot be moved upwardly under the action of its spring 15. In this position the upper surface of the release button 10 is flush with the upper wall 21 of the housing.

The slide 5 is provided with an electrical contact 19 which will engage a stationary electrical contact 22 when the slide moves to the left to close an electrical circuit leading to the shutter to release the shutter in a known manner.

The top surface of the release button 10 will remain flush with the housing wall 21 until the camera is cocked. Thus when the camera is not ready for making an exposure the button will be flush with the camera housing and thus will not present any obstruction nor can the button be actuated.

The shutter must be first cocked in order to be subsequently released to effect an exposure of the film. The shutter is cocked by rotation of the gear 2 through a complete revolution by rotating the winding knob 1 through a half revolution as described above. The shutter-cocking mechanism comprises a cam 14 on the gear 2 which is shaped to act in parallel with the axis of rotation of gear 2. An axially displaceable stud or rod 12 is moved under the action of the cam 14. The stud 12 acts upon a plate 13 which is pivotally mounted to the camera housing at 23 and is operatively connected to the mechanism for cocking the shutter. The plate 13 maintains an operative connection between the cam 14 and the shutter even when the objective is of the type which can be withdrawn from the camera for making an exposure.

Figure 7:
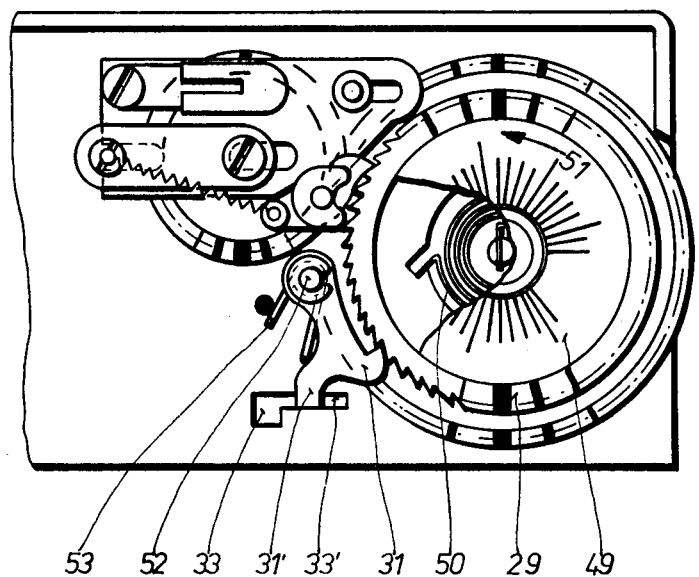
FIG. 7 is a view similar to that of FIG. 6 and showing a portion of the counter removed.
Figure 8:
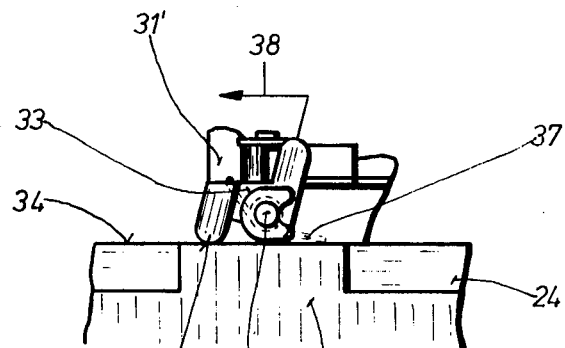
FIG. 8 is an elevational view of a portion of FIG. 7 showing the locking pawl; and, FIG. 9 is a view similar to that of FIG. 8 but showing the position of the locking pawl after the camera housing has been removed.

Also mounted upon the slide 5 is a pivotally mounted pawl 7 which engages a helical tooth of the gear 29 and advances the gear 29 by a unit or tooth when the slide 5 reaches its right end position. The gear 29 carries a counter disc 49 which functions as an exposure counter. As can be seen in FIG. 7, the gear 29 is subjected to the action of a coil spring 50 which acts upon the gear 29 to turn the gear in the direction of the arrow 51. Rearward rotation of the gear 29 is prevented by a lock pawl 31 which is pivotally mounted on a pin 52 and is engagable with the teeth on the gear 29. A spring 53 acts upon the pawl 31 to press the pawl 31 into the teeth of gear 29. A lever 33 has an upstanding angular portion 33 which engages behind the rear portion of an end 31' of the lock pawl 31 and is pivoted upon a pin 36. The lever 33 comprises a second arm 33" which rests upon an upper edge 34 of a rear wall 24 of the housing as shown in FIG. 8 when the housing is in closed position upon the camera. The rear wall of the housing urges the lever 33 against the action of a spring 37 to the right to release lock pawl 31 so that it can engage the teeth of gear 29.

Figure 9:
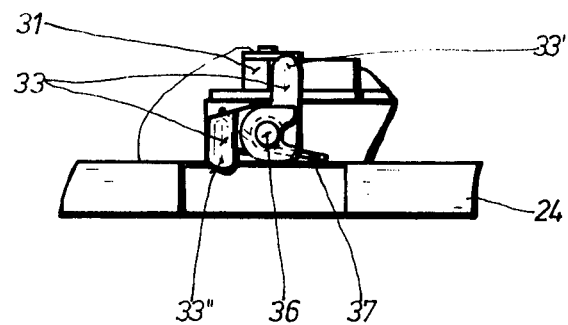

When the rear wall of the housing is removed as shown in FIG. 9 for any purpose such as for replacing the film, the spring 37 will pivot the lever 33 in the direction of the arrow 38 as shown in FIG. 8. The action of arm 33' against lock pawl 31 will lift the pawl 31 from its engagement with gear teeth 29. The coil spring 50 will then rotate the gear 29 and counter disc 49 back into their zero positions. A zero stop is provided which comprises an upturned detent 55 engaging the end of an arcuate groove 56 so that the counter is returned precisely to the zero position.

The slide 5 and possibly other parts of the camera mechanism as described above may be made of an electrically insulating synthetic resin material and thus eliminates the necessity for utilizing additional space consuming electrical insulation when the above described parts are formed from metal.

It will be understood that this invention is susceptible to modification in order to adapt it to different usages and conditions, and accordingly, it is desired to comprehend such modifications within this invention as may fall within the scope of appended claims.

What is claimed is:

1. In a camera, the combination of a rotatable winding knob to move film in the camera and to cock a shutter of an objective, a slide operatively connected to said winding knob and displaceable between initial and end positions, a spring connected to said slide to urge the slide into the initial position, a release button blocked from actuation by said slide in its inital position and released for actuation when the slide is in its end position, means co-acting between said release button and said slide for releasing said slide for displacement to its initial position under action of said spring upon actuation of said release button, and electric contact means closed by said slide returning to its initial position for actuating a circuit to operate a shutter of a camera.

2. In a camera as claimed in claim 1 wherein there is a slot in said slide and said release button has a rod passing through said slot, said slot having a wider portion, said release button rod having a larger diameter portion movable through said slot wider portion.

3. In a camera as claimed in claim 2 and a second spring acting upon said release button in a position opposite to the actuation direction thereof.

4. In a camera as claimed in claim 1 wherein said release button has an outer face flush with a housing wall of the camera when in its blocked position.

5. In a camera as claimed in claim 1 and a rotatable cam disc operably connected to said winding knob, and a pin on said slide engageable with said cam disc.

6. In a camera as claimed in claim 5 and gear means on said cam disc for connecting said cam disc operably to said winding knob, and stop means on said gear means engagable by said slide pin.

7. In a camera as claimed in claim 6 and a second cam on said gear means, a stud axially displaceable parallel to the axis of rotation of said cam disc and engagable by said second cam, said stud operable to cock the shutter of the objective.

8. In a camera as claimed in claim 7 and a pivotally mounted plate engagable by said stud and operatively connected to a shutter.

9. In a camera as claimed in claim 6 and second gear means on said winding knob for operably engaging with said gear means on said cam disc, there is a ratio of 1:2 between said gear means on said cam disc and said second gear means on said winding knob respectively.

10. In a camera as claimed in claim 1 and a pawl on said slide, and a gear having peripheral teeth thereon connected to an exposure counter and advancing the distance of one tooth under the action of said pawl upon displacement of said slide to its end position.

11. In a camera as claimed in claim 10 wherein said gear has said teeth only over a portion of its periphery.

12. In a camera as claimed in claim 1 wherein said slide, knob, release button are formed of an electrically insulating synthetic resin.

13. In a camera as claimed in claim 10 and a second pawl pivotally mounted on a portion of the camera, a lever having a first portion thereon engagable by a housing wall of the camera and a second portion thereon engagable with said second pawl, said lever releasing said second pawl when the camera housing wall is closed so that said second pawl can engage the teeth of said second gear means.

14. In a camera as claimed in claim 13 and a spring acting upon said lever to disengage said second pawl from the teeth of said gear when the camera housing wall is opened, and a second spring acting upon said gear and exposure counter to return said exposure counter to its zero position upon opening of the housing wall.

15. In a camera as claimed in claim 14 and stop means for stopping the return of the counter in its zero position.

* * * * *